(12) United States Patent
Sajima et al.

(10) Patent No.: US 10,345,516 B2
(45) Date of Patent: Jul. 9, 2019

(54) OPTICAL FIBER CABLE

(71) Applicants: FUJIKURA LTD., Tokyo (JP); NIPPON TELEGRAPH AND TELEPHONE CORPORATION, Tokyo (JP)

(72) Inventors: Yoshie Sajima, Chiba (JP); Kouji Tomikawa, Chiba (JP); Ken Osato, Chiba (JP); Masayoshi Yamanaka, Chiba (JP); Naoki Okada, Chiba (JP); Shinya Hamaguchi, Tokyo (JP); Naoki Nakagawa, Tokyo (JP); Yusuke Yamada, Tokyo (JP); Hisaaki Nakane, Tokyo (JP)

(73) Assignees: FUJIKURA LTD., Koto-ku, Tokyo (JP); NIPPON TELEGRAPH AND TELEPHONE CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/301,995

(22) PCT Filed: Apr. 28, 2015

(86) PCT No.: PCT/JP2015/062750
§ 371 (c)(1),
(2) Date: Oct. 5, 2016

(87) PCT Pub. No.: WO2015/170633
PCT Pub. Date: Nov. 12, 2015

(65) Prior Publication Data
US 2017/0115451 A1 Apr. 27, 2017

(30) Foreign Application Priority Data
May 9, 2014 (JP) .................................. 2014-097646

(51) Int. Cl.
*G02B 6/44* (2006.01)
*G02B 6/04* (2006.01)

(52) U.S. Cl.
CPC .............. *G02B 6/04* (2013.01); *G02B 6/441* (2013.01); *G02B 6/4403* (2013.01);
(Continued)

(58) Field of Classification Search
USPC ......................................... 385/114
See application file for complete search history.

(56) References Cited

U.S. PATENT DOCUMENTS 4,375,313 A * 3/1983 Anderson ............ G02B 6/4413
174/109
5,373,100 A 12/1994 Arroyo et al.
(Continued)

FOREIGN PATENT DOCUMENTS

CN 1412590 A 4/2003
JP 63-237008 A 10/1988
(Continued)

OTHER PUBLICATIONS

Communication dated Oct. 3, 2016 from the Taiwanese Patent Office in counterpart Taiwan application No. 104114275.
(Continued)

*Primary Examiner* — Eric Wong
(74) *Attorney, Agent, or Firm* — Sughrue Mion, PLLC

(57) ABSTRACT

[Object] In an optical fiber cable including a plurality of optical fiber units each formed by tying optical fibers in a bundle, preferable water resistance is to be achieved without increasing an outer diameter of the optical fiber cable.
[Solution] An optical fiber cable includes: a plurality of optical fiber units each including a plurality of optical fibers and a bundling member wound around an outer periphery of a bundle of the plurality of optical fibers, the bundling
(Continued)

member having a surface to which a water-absorbent granular substance is detachably attached.

6 Claims, 6 Drawing Sheets

(52) U.S. Cl.
CPC ......... *G02B 6/4432* (2013.01); *G02B 6/4494* (2013.01); *G02B 6/4407* (2013.01); *G02B 6/4434* (2013.01); *G02B 6/4482* (2013.01)

(56) References Cited

U.S. PATENT DOCUMENTS

| | | | |
|---|---|---|---|
| 6,749,446 B2 | 6/2004 | Nechitailo | |
| 8,180,190 B2* | 5/2012 | Bringuier | G02B 6/4483 385/109 |
| 8,620,124 B1* | 12/2013 | Blazer | G02B 6/4489 385/102 |
| 2010/0189396 A1* | 7/2010 | Hashimoto | G02B 6/443 385/112 |
| 2014/0231636 A1* | 8/2014 | Goldner | G01H 9/004 250/227.11 |
| 2016/0223769 A1* | 8/2016 | Ito | G02B 6/4405 |

FOREIGN PATENT DOCUMENTS

| | | | | |
|---|---|---|---|---|
| JP | 09-80278 | A | | 3/1997 |
| JP | 2007-279226 | A | | 10/2007 |
| JP | 2010-139631 | A | | 6/2010 |
| JP | 2011-232374 | A | | 11/2011 |
| JP | 201397320 | | * 11/2011 | ............... G02B 6/44 |
| JP | 2012103293 | A | | 5/2012 |
| JP | 2012-212097 | A | | 11/2012 |
| JP | 2013-097350 | A | | 5/2013 |
| JP | 2013097320 | A | | 5/2013 |
| JP | 2013186286 | A | | 9/2013 |
| TW | 182706 | | | 4/1992 |
| TW | 215964 | B | | 11/1993 |

OTHER PUBLICATIONS

International Search Report of PCT/JP2015/062750 dated Aug. 4, 2015 [PCT/ISA/210].
International Preliminary Report on Patentability issued from the International Bureau in counterpart International Application No. PCT/JP2015/062750, dated Nov. 24, 2016.
Communication dated Apr. 25, 2017, from the Japanese Patent Office in counterpart application No. 2014-097646.
Communication dated Oct. 3, 2016, from the Intellectual Property Office of Taiwan in counterpart application No. 104114275.
Machine Translation of JP 2012-212097, published Nov. 1, 2012. (previously filed Oct. 5, 2016).
Machine Translation of JP 09080278, published Mar. 28, 1997. (previously filed Oct. 5, 2016).
Machine Translation of JP 2007279226 A, published Oct. 25, 2007. (previously filed Oct. 5, 2016).
Machine Translation of JP 63237008 A, published Oct. 3, 1988. (previously filed Oct. 5, 2016).
Machine Translation of JP 2010139631 A, published Jun. 24, 2010. (previously filed Oct. 5, 2016).
Communication dated Oct. 24, 2017 from the Japanese Patent Office in counterpart Japanese application No. 2014-097646.
Communication dated Mar. 13, 2018 from the Japanese Patent Office in counterpart Japanese application No. 2014-097646.
Communication dated Sep. 11, 2018, from the State Intellectual Property Office of People's Republic of China in counterpart application No. 201580016843.3.
Communication dated Jan. 29, 2019 from the Japanese Patent Office in application No. 2018-7592.

* cited by examiner

| NUMBER OF CORES | 100 | 200 | 300 | 400 | 500 | 1000 | 2000 |
|---|---|---|---|---|---|---|---|
| FIRST EMBODIMENT | ○ | ○ | ○ | ○ | ○ | ○ | ○ |
| COMPARISON EXAMPLE | ○ | ○ | ○ | ○ | × | × | × |

○ : PASSED    × : FAILED

FIG. 5

| ABSORPTION RATE | 2 | 2.5 | 3 | 3.5 | 4 | 4.5 | 5 |
|---|---|---|---|---|---|---|---|
| FIRST EMBODIMENT | × | × | ○ | ○ | ○ | ○ | ○ |

○:PASSED  ×:FAILED

FIG. 6

OPTICAL FIBER CABLE

CROSS REFERENCE TO RELATED APPLICATIONS

This application is a National Stage of International Application No. PCT/JP2015/062750, filed Apr. 28, 2015, claiming priority based on Japanese Patent Application No. 2014-097646, filed May 9, 2014, the contents of all of which are incorporated herein by reference in their entirety.

TECHNICAL FIELD

The present invention relates to an optical fiber cable.

BACKGROUND ART

A technique is known in which an optical fiber cable is configured with optical fiber assemblies each formed by tying a plurality of optical fibers in a bundle as an optical fiber unit. In such a case, a common method is to wind a coarse string (bundling member) around the bundle of the optical fibers, thereby identifying the optical fiber unit with the color of the bundling member while restraining the bundle of the optical fibers from spreading out.

With regard to such a bundling member, Patent Literature 1 discloses a method of providing water resistance to an optical fiber unit by using water absorptive yarn as a bundling member. Further, Patent Literature 2 discloses a method of facilitating identification of an optical fiber unit by coloring a bundling member thereof with a single color.

CITATION LIST

Patent Literature

[PTL 1] Japanese Patent Application Laid-open Publication No. 2011-232347
[PTL 2] Japanese Patent Application Laid-open Publication No. 2013-097350

SUMMARY OF INVENTION

Technical Problem

In an optical fiber cable, water resistance is important. However, it has been becoming impossible to obtain sufficient water resistance by such conventional methods, as the number of optical fibers in an optical fiber unit has been increasing in response to the demands for multicore structure, which is associated with increase in capacity of transmission data. For example, in the case of a multicore optical fiber cable, since the diameter of the cable increases, the moisture having entered inside cannot be eliminated by the conventional methods. Thus, it is difficult to obtain preferable water resistance. Further, when a great amount of water absorptive yarn or the like is mounted so as to maintain water resistance, the outer diameter of the optical fiber cable is increased, which may cause a problem.

A primary object of the present disclosure is to achieve preferable water resistance without increasing an outer diameter in an optical fiber cable that includes a plurality of optical fiber units each formed by tying optical fibers in a bundle using a bundling member.

Solution to Problem

A principal aspect of the present disclosure to achieve an object described above is an optical fiber cable comprising:
a plurality of optical fiber units each including
a plurality of optical fibers and
a bundling member wound around an outer periphery of a bundle of the plurality of optical fibers,
the bundling member having a surface to which a water-absorbent granular substance is detachably attached.

Other features of the present disclosure will become apparent from the description of this specification and the accompanying drawings.

Advantageous Effects of Invention

According to the present disclosure, it is possible to achieve preferable water resistance without increasing an outer diameter in an optical fiber cable including a plurality of optical fiber units each formed by tying optical fibers in a bundle using a bundling member.

BRIEF DESCRIPTION OF DRAWINGS

FIG. 5 is a diagram showing a result of water resistance comparison between an optical fiber cable 1 according to a first embodiment and a conventional optical fiber cable (comparison example).
FIG. 6 is a diagram showing a result of a test with respect to a relationship between absorption rate of a bundling member and water resistance.

DESCRIPTION OF EMBODIMENTS

Figure 1:
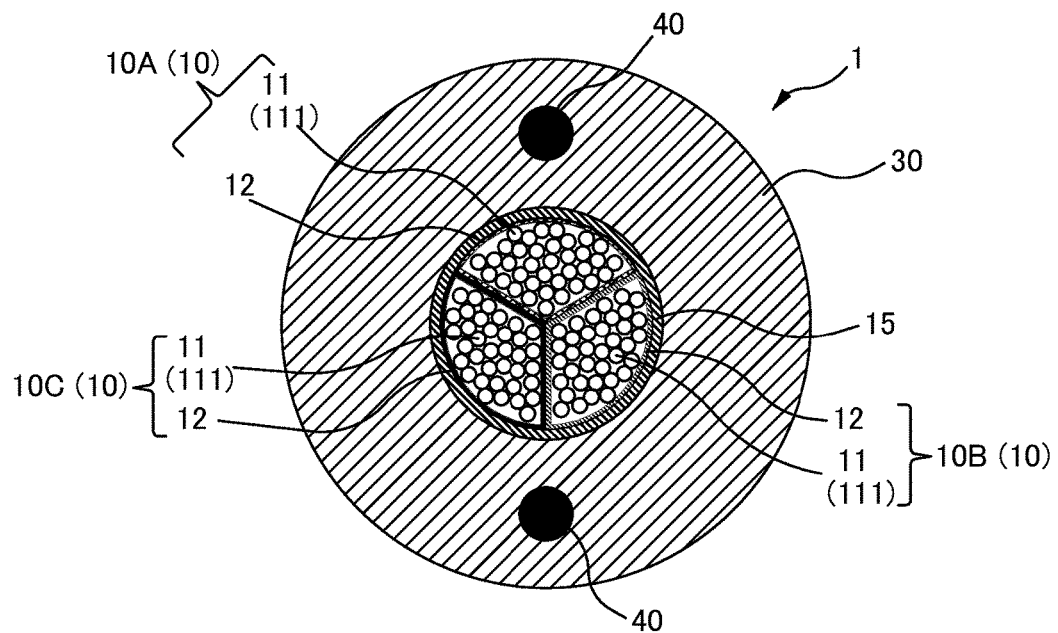
FIG. 1 is a cross-sectional view illustrating an optical fiber cable 1 according to a first embodiment.

At least the following matters will become apparent from the specification which will be described later and the accompanying drawings.

An optical fiber cable becomes apparent which comprises: a plurality of optical fiber units each including a plurality of optical fibers and a bundling member wound around an outer periphery of a bundle of the plurality of optical fibers, the bundling member having a surface to which a water-absorbent granular substance is detachably attached.

According to such an optical fiber cable, preferable water resistance can be achieved without increasing the outer diameter thereof.

It is preferable that, in such an optical fiber cable, the bundling member includes a core portion and a cladding portion provided to coat the core portion, the cladding portion being configured with a member having a melting point lower than a melting point of the core portion.

According to such an optical fiber cable, the bundling members can be heat-sealed to each other by melting the cladding portion.

It is preferable that, in such an optical fiber cable, the optical fiber unit includes an optical fiber ribbon, the optical fiber ribbon being configured with optical fibers arranged in a parallel manner, the optical fibers included in the plurality of optical fibers, the optical fiber ribbon having connecting portions intermittently arranged in a longitudinal direction and a width direction in the optical fiber ribbon, the connecting portions connecting each two optical fibers immediately adjacent to each other in the optical fibers.

According to such an optical fiber cable, a plurality of optical fibers is assembled to be formed in a ribbon (tape) form, thereby facilitating handling and managing of the optical fibers.

It is preferable that, in such an optical fiber cable, a plurality of bundling members is wound around the outer periphery of the bundle of the optical fibers, the bundling member including the plurality of bundling members.

According to such an optical fiber cable, the plurality of bundling members are wound around the bundle of the optical fibers, thereby causing more water-absorbent substance detached from the bundling members to easily move inside the bundle of the optical fibers. Therefore, water resistance can be improved.

It is preferable that, in such an optical fiber cable, the optical fiber unit includes at least 500 of the optical fibers.

According to such an optical fiber cable, preferable water resistance can be achieved even in a multicore optical fiber cable containing 500 or more of optical fibers.

It is preferable that, in such an optical fiber cable, a rate of a volume of the bundling member after absorbing moisture to a volume of the bundling member before absorbing moisture is equal to or more than 3.

According to such an optical fiber cable, preferable water resistance can be achieved even in a supper-multicore optical fiber cable containing about 2000 of the optical fibers.

First Embodiment

<Configuration of Optical Fiber Unit>

An optical fiber unit having preferable water resistance and an optical fiber cable including the optical fiber unit will be described below. FIG. 1 is a cross-sectional view illustrating an optical fiber cable 1 according to a first embodiment.

The optical fiber cable 1 comprises an optical fiber unit 10 (10A-10C), a sheath 30, and a tension member 40. The optical fiber units 10 are each configured such that a plurality of optical fibers 111 are tied with a bundling member 12 so as not to spread out. In FIG. 1, the optical fiber cable 1 is configured with three optical fiber units 10, which are optical fiber units 10A, 10B, and 10C, and the number of the optical fiber units 10 included in the optical fiber cable 1 varies, as appropriate, with the uses of the optical fiber cable, and the like. The periphery of the optical fiber units 10A to 10C is covered with press-wrapping 15 that is formed with non-woven fabric or the like, and the outer periphery of such wrapping is coated with the sheath 30, which is a jacket of the optical fiber cable 1. Further, such tension members 40 are provided in the sheath 30.

(Optical Fiber Unit 10)

Figure 2:
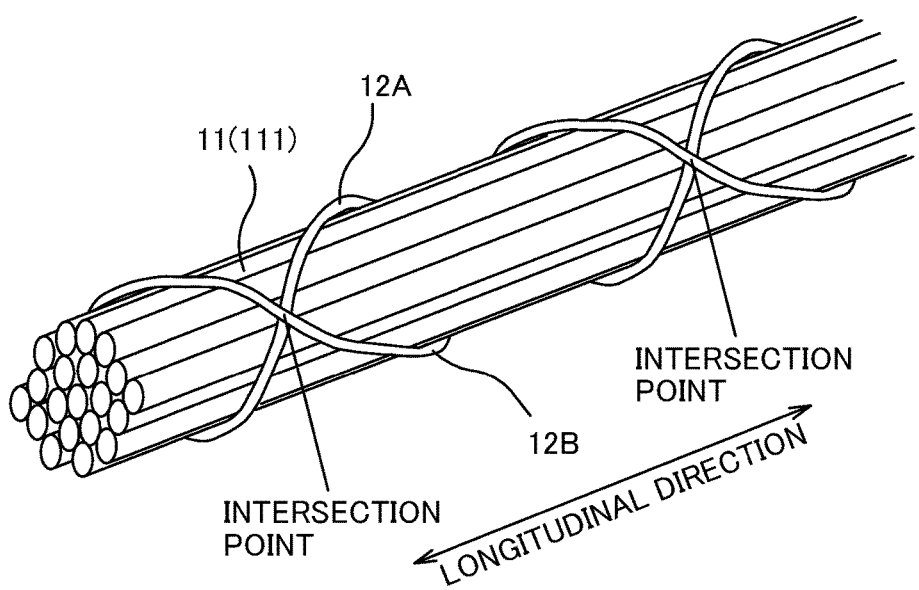
FIG. 2 is a schematic view illustrating an optical fiber unit 10 according to a first embodiment.
Figure 3:
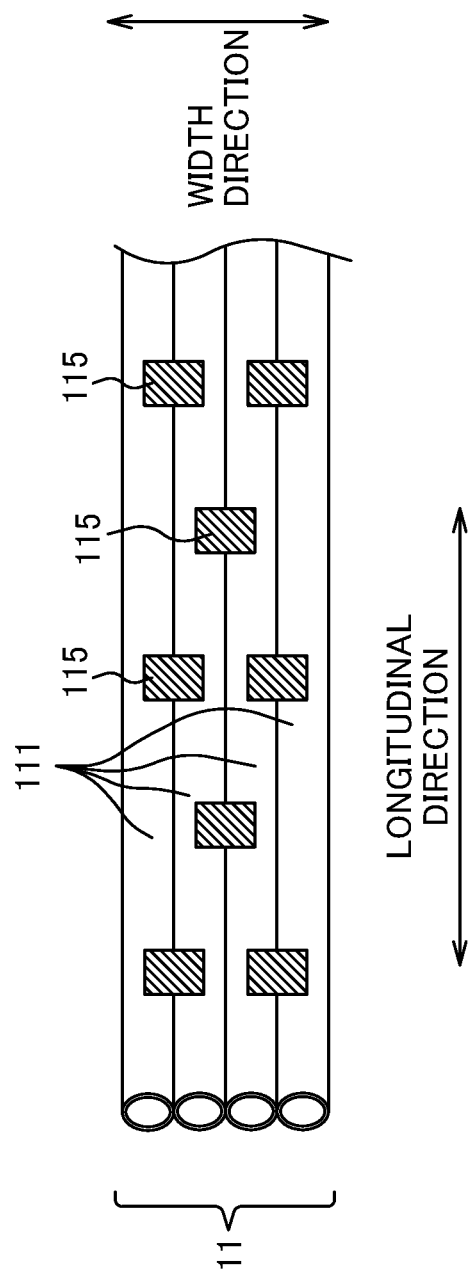
FIG. 3 is a schematic view illustrating an intermittently fixed core ribbon 11.

FIG. 2 is a schematic view illustrating the optical fiber unit 10. FIG. 3 is a schematic view illustrating intermittently fixed ribbon 11.

The optical fiber units 10 according to an embodiment of the present disclosure are each formed such that the intermittently fixed ribbon 11, which is configured with the plurality of optical fibers 111, are crowded in a bundle manner, and then the bundling member 12 is wound around the periphery of such fibers thereby tying the fibers.

The intermittently fixed ribbon 11 is a so-called optical fiber ribbon, which is configured such that the optical fibers 111 are arranged in parallel and such optical fibers 111 are assembled by connecting each two optical fibers 111 immediately adjacent to each other using connecting portions 115, thereby forming the optical fibers 111 into a ribbon. In FIG. 3, the intermittently fixed ribbon 11 is formed with four of the optical fibers 111. However, the number of the optical fibers 111 configuring the intermittently fixed ribbon 11 is not limited thereto. The optical fibers 111 are each configured such that a periphery of a bare fiber, which is a transmission line used to carry light, is coated with two cladding layers (soft/hard). For example, the bare fiber is configured with a glass material, etc., having a diameter of 125 μm. The cladding layer is configured with, for example, an ultraviolet curable resin or a thermoset resin. Then, a colored layer is formed on the cladding layer, and such an optical fiber 111 can be identified by the color of its colored layer. In an embodiment of the present disclosure, the diameter of the optical fiber 111 including the colored layer is about 250 μm. It should be noted that the hard layer itself of the cladding layer may be colored without forming a colored layer. The connecting portions 115 each are a member connecting each two of the optical fibers 111 immediately adjacent to each other in the width direction. As illustrated in FIG. 3, in the intermittently fixed ribbon 11, the connecting portions 115 are intermittently arranged in the longitudinal direction and the width direction of the optical fibers 111. Further, a predetermined space is provided between each two optical fibers 111 immediately adjacent to each other in the width direction. The intermittently fixed ribbon 11 is capable of being bent at apart of the connecting portions 115, and can be tied in a bundle as illustrated in FIG. 2.

It should be noted that the optical fiber unit 10 according to an embodiment of the present disclosure also includes such a unit that a plurality of optical fibers 111 are tied in a bundle using the bundling member 12 with the optical fibers not being formed in to a ribbon but each being a separate single fiber.

The bundling member 12 is a member to bundle the intermittently fixed ribbon 11 (optical fibers 111), and a plurality of such bundling members 12 are provided to a single optical fiber unit 10. The optical fiber unit 10 according to an embodiment of the present disclosure is provided with two bundling members, i.e., the bundling member 12A and the bundling member 12B, as illustrated in FIG. 2. The bundling member 12A and the bundling member 12B are spirally wound around the bundle of the intermittently fixed ribbon 11 (optical fibers 111) such that their winding directions become opposite to each other. Then, the bundling member 12A and the bundling member 12B are joined to each other by heat-sealing at intersection points (contact points).

Since the bundling member 12A and the bundling member 12B are only individually wound in a spiral manner, the optical fiber unit 10 can easily be manufactured. Further, since two bundling members are joined to each other at their intersecting points, the bundling members are restrained from coming loose. Even if the two bundling members at such a joining part are unstuck, the bundling member 12A and the bundling member 12B are individually wound in a spiral manner, and thus there is less possibility that the bundling members are immediately disengaged from the outer periphery of the bundle of the intermittently fixed ribbon 11. Therefore, the bundle of the intermittently fixed ribbon 11 is less likely to come apart.

Figure 4A:
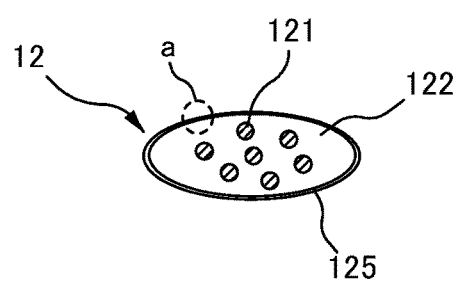
FIG. 4A is a diagram illustrating a cross-sectional structure of a bundling member 12.
Figure 4B:
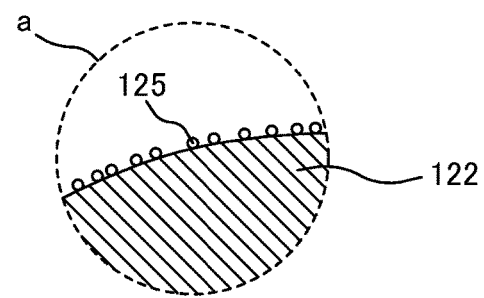
FIG. 4B is an enlarged view of a part "a" in FIG. 4A.

FIG. 4A is a diagram illustrating a cross-sectional structure of the bundling member 12. FIG. 4B is an enlarged view of a part "a" in FIG. 4A. The bundling member 12 includes:

one or a plurality of core portions 121 extending in the longitudinal direction of the optical fiber unit 10; and a cladding portion 122 that coats the outer periphery of the core portion(s) 121 and has a melting point lower than that of the core portion 121. A water-absorbent substance 125 is detachably attached to a surface of the cladding portion 122.

The bundling members 12A and 12B can be heat-sealed at the contact point of the members due to adhesiveness that is exhibited by heating the cladding portion 122 to its melting point or more. It is preferable that the difference between the melting point of the core portion 121 and the melting point of the cladding portion 122 is equal to or higher than 20° C. The melting point of the core portion 121 is preferably at around 160° C., and the melting point of the cladding portion 122 is preferably at around 90 to 130° C. Further, the cladding portion 122 is required to not adhere to the optical fibers 111 even melted by being heated, or is required to have a less adhesive strength even adhering thereto, and further the cladding portion 122 is required to not deteriorate the cladding layers of the optical fibers 111.

For each of the core portion 121 and the cladding portion 122, such materials can be used: a resin having a higher melting point, e.g., polypropylene (PP), polyamide (PA), polyethylene terephthalate (PET), etc.; a fiber having a higher melting point, e.g., polypropylene fiber, polyamide fiber (nylon (registered trademark), etc.), polyester fiber (PET fiber, etc.), etc.; or a thermoplastic resin, which is capable of being repeatedly and reversibly softened/hardened by heating/cooling with respect to a tape or film having a high melting point such as PET, PP, etc.; a material having a low melting point, e.g., polypropylene (PE), ethylene-vinyl acetate copolymer (EVA), and ethylene-ethyl-acrylate copolymer (EEA); a material covered with a so-called heat-melt type (hot-melt) adhesive, which includes a thermoplastic resin or rubber as a base material and is capable of being repeatedly and reversibly softened/hardened by heating/cooling; or the like.

It should be noted that the bundling members 12A and 12B may be configured not with a composite material of a material having a higher melting point (core portion 121) and a material having a low melting point (cladding portion 122), as illustrated in FIG. 4, but with a single material. For example, the bundling members may be configured with either a material having a high melting point or a material having a low melting point, and further, materials may be different between the bundling members 12A and 12B.

Further, the bundling member 12A and the bundling member 12B may be joined not by heat-sealing but with an adhesive. An adhesive used when bonding the bundling members includes, for example, an adhesive of ultraviolet curable resin, an adhesive of modified olefin or the like using solvent, and a reactive adhesive such as an epoxy adhesive.

Further, the strength of joint at the joining parts of the bundling members 12A and 12B is preferably of such a degree that the bundling members are not unexpectedly unstuck at the joining part while can be unstuck by hand as required. With such a configuration, in an intermediate branching operation, it becomes possible to broaden a pull-out part by detaching the bundling members 12A and 12B by hand without cutting them. Further, if the joint strength is equal to or smaller than the rupture strength of the bundling members, preferably equal to or smaller than the yield strength, the bundling members 12 can be detached without being stretched resulting in break.

Further, the two bundling members 12A and 12B can be joined again by being heated with a heater or being applied with an adhesive after the optical fiber(s) 111 is pulled in the intermediate branching work.

The water-absorbent substance 125 is a water-absorbent granular substance (particulate matter), and is applied throughout the cladding portion 122 such that the water-absorbent substance 125 is attached substantially evenly, thereby forming a water-absorbing layer on the surface of the cladding portion 122. It should be noted that when the bundling members 12 are of a flat elliptical shape or a flat band shape, as illustrated in FIG. 4A, the water-absorbent substance 125 is not necessarily applied throughout the surface of the cladding portion 122. In such a case, the water-absorbent substance 125 should be applied to at least a surface of the bundling member 12 on the side which is to be contacted by the bundle of the intermittently fixed ribbon 11 (optical fibers 111) when the bundling member 12 is wound around the bundle.

As the water-absorbent substance 125 according to an embodiment of the present disclosure, water-absorbent resin powder is used, such as polyacrylate-based resin, polyvinyl alcohol-based resin, polyacrylamide-based resin, polyoxyethylene-based resin, or the like. Further, the water-absorbent substance 125 is applied not in a state in which the substance is fixed to the surface of the cladding portion 122, but in a state in which the substance is detachable from the surface of the cladding portion 122. Thus, in a state where the bundling members 12A and 12B are wound around the bundle of the intermittently fixed ribbon 11 (optical fibers 111), the water-absorbent substance 125 is partially detached from the surface of the cladding portion 122, and is attached to the optical fibers 111 and/or the press-wrapping 15. Thereby, the optical fiber unit 10 obtains a preferable water resistance. The water resistance of the optical fiber unit 10 will be described later in detail.

Further, the two bundling members 12A and 12B are applied with individual color (s) so that a plurality of such optical fiber units 10 can be identified. For example, in FIG. 1, three optical fiber units, i.e., the optical fiber units 10A to 10C, are housed inside the optical fiber cable 1. In this case, the bundling members 12, which are to be wound around the optical fiber unit 10A to 10C, are colored with predetermined colors individually, thereby being able to easily identify the optical fiber units 10A to 10C.

(Sheath 30)

The sheath 30 coats the outer periphery of the optical fiber unit 10 covered with the press-wrapping 15, and protects the optical fiber unit 10 inside the sheath 30 (FIG. 1). The sheath 30 is formed using, for example, a resin such as polyethylene resin.

(Tension Member 40)

The tension member 40 is a strength member for restraining the tension loaded to the optical fiber cable 1 from directly being conducted to the optical fibers 111 (FIG. 1). The tension member 40 is configured with, for example, steel wire.

<Water Resistance of Optical Fiber Unit 10>

In the optical fiber cable 1 illustrated in FIG. 1, when moisture enters the interior of the sheath (portion corresponding to the optical fiber units 10), such moisture moves on the optical fiber units 10 and the optical fibers 111 to travel in the longitudinal direction. Accordingly, the optical fibers 111 are brought in a state in which such moisture is attached in a wide range in the longitudinal direction. Attachment of moisture to the optical fibers 111 may cause reduction in their strength and/or life, and also may cause increase in transmission loss of the optical fibers. Thus, it is preferable that the optical fiber cable 1 has an excellent water resistance. Especially, when the optical fiber cable 1 is provided underground, there is high possibility that moisture enters the interior of the cable. Therefore sufficient water resistance is required.

In the optical fiber unit 10 according to an embodiment of the present disclosure, the water-absorbent substance 125 is attached to the surface of the bundling member 12, which is to tie the intermittently fixed ribbon 11 (optical fibers 111) in a bundle. Thus, the bundling member 12 itself is configured to easily absorb moisture. Further, a part of the water-absorbent substance 125 is detached from the surface of the bundling member 12, to enter the interior of the optical fiber unit 10, and is attached to the optical fibers 111. Thereby, a portion corresponding to the optical fibers 111 is also configured to easily absorb moisture. That is, in the optical fiber unit 10 according to an embodiment of the present disclosure, moisture can be absorbed not only in the outer periphery of the bundle of the intermittently fixed ribbon 11 (optical fibers 111) but also inside thereof.

A conventional optical fiber cable was rendered waterproof by winding a water-absorbent yarn around the outer periphery of the optical fiber unit or forming the press-wrapping 15 (see FIG. 1) using a water-absorbing sheet. However, by these methods, the moisture having entered the interior of the optical fiber unit could not be absorbed, and thus sufficient water resistance could not be obtained. Further, when more water-absorbent yarns and/or the like are mounted in order to improve water resistance, the outer diameter of the optical fiber cable is increased, which may cause a problem.

On the other hand, the optical fiber cable 1 according to an embodiment of the present disclosure, in which the bundling members 12 are wound around the optical fiber units 10, obtains sufficient water resistance, while restraining such a problem that the outer diameter of the optical fiber cable is increased. Further, as illustrated in FIG. 1, the optical fiber cable 1 includes the three optical fiber units 10A to 10C. The bundling members 12 applied with the water-absorbent substance 125 are wound around each of the optical fiber units 10A to 10C, thereby facilitating the diffusion of the water-absorbent substance 125 into all the areas of the inside of the optical fiber cable 1. In other words, accessibility for the water-absorbent substance 125 to reach the central region of the optical fiber cable 1 is increased. Thus, even if the optical fiber cable contains a large number of (e.g., 500 or more) optical fibers, it is possible to efficiently absorb the moisture that has entered the interior.

FIG. 5 illustrates the comparison results of water resistance between the optical fiber cable 1 according to a first embodiment and the conventional optical fiber cable (comparison example).

In the optical fiber cable of the comparison example, the press-wrapping 15 having water absorbency is wound around the bundles of the intermittently fixed ribbons 11 and the bundling member 12 does not have water absorbency. A waterproof test was conducted on the optical fiber cable 1 according to an embodiment of the present disclosure and the optical fiber cable of the comparison example, in cases where the number of optical fibers housed inside the cable are changed in a range from 100 to 2000, and their water resistance was evaluated. In the method of waterproof test, conducted was a water running test in a case where hydraulic (head) pressure corresponding to 1 m is applied from one end surface of the cable, according to JIS C6851-25, or IEC60794-1-2 (method F5). Under these conditions, the case where water did not leak out from the end surface opposite to the end surface into which water pours was evaluated as "0" (passed), while the case water leaked out therefrom was evaluated as "x" (failed).

As a result of such experiments, in cases where the number of the optical fibers is 400 or less, both the optical fiber cables of an embodiment of the present disclosure and the comparison example were evaluated as "o" with regard to water resistance. On the other hand, in cases where the number of optical fibers is 500 or more, the optical fiber cable of the comparison example was evaluated as "x", whereas the optical fiber cable 1 of an embodiment of the present disclosure is evaluated as "o" with regard to water resistance.

In the optical fiber cable of the comparison example, since moisture is absorbed by the water-absorbent press-wrapping 15 wound around the outer periphery of the bundles of the optical fiber units, the moisture of the outer periphery of the optical fiber units can be absorbed, however it is difficult to absorb the moisture having entered the interior of the optical fiber units. Thus, in cases where the optical fiber cable includes a large number optical fibers, i.e., 500 or more, water resistance becomes insufficient. This is because the diameter of the bundles of the optical fiber units is increased as the number of optical fibers is increased, which makes it difficult to absorb the moisture having entered the interior of the optical fiber units.

On the other hand, in the optical fiber cable according to an embodiment of the present disclosure, the bundling members 12 wound around each of the optical fiber units 10 absorb the moisture. As illustrated in FIG. 1, the optical fiber cable is configured such that the bundling members 12 are arranged also near the central portion of the optical fiber cable 1, which facilitates the absorption of the moisture having entered the interior of the optical fiber cable. Furthermore, the optical fiber cable according to an embodiment of the present disclosure facilitates the absorption of the moisture, also with the water-absorbent substance 125 which is detached from the bundling members 12 to be attached to the optical fibers 111. Therefore, even if the optical fiber cable includes a large number, i.e., 500 or more, of optical fibers, preferable water resistance can be obtained.

Subsequently, the water-absorptive capacity of the bundling member 12 wound around the optical fiber unit 10 will be verified. FIG. 6 shows a result of a test with regard to a relationship between absorption rate of the bundling member and water resistance. It should be noted that the water absorption rate of the bundling member is a ratio of the volume of the bundling member between the volume thereof before absorbing moisture and the volume thereof after absorbing moisture. The bundling member 12 (water-absorbent substance 125) absorbs moisture to swell, thereby increasing the volume thereof. That is, the higher the water absorption rate of the bundling member is, the more the moisture can be absorbed. The optical fiber cable 1 which is used for such a waterproof test is a multicore cable having 2000 of the optical fibers 111. The waterproof test was conducted on such a cable, while the water absorption rate of the bundling member 12 is being changed, thereby evaluating the relationship between the water absorption rate and the water resistance. It should be noted that the method and condition of the waterproof test is similar to those in the above described FIG. 5.

As a result of the test, when the water absorption rate was equal to or lower than 2.5, the water resistance was evaluated as "x", and when the water absorption rate is equal to or higher than 3, the water resistance was evaluated as "o".

From this result, it became clear that sufficient water resistance can be obtained even with the optical fiber cable having a large number, i.e., 2000, of optical fibers by using the bundling member having a water absorption rate of three times or more.

<Modification>

In an optical fiber cable of a modification, a method of housing the optical fiber units 10 is different. The configurations of the optical fiber units 10 and the bundling members 12 themselves are substantially similar to those in a first embodiment.

Figure 7:
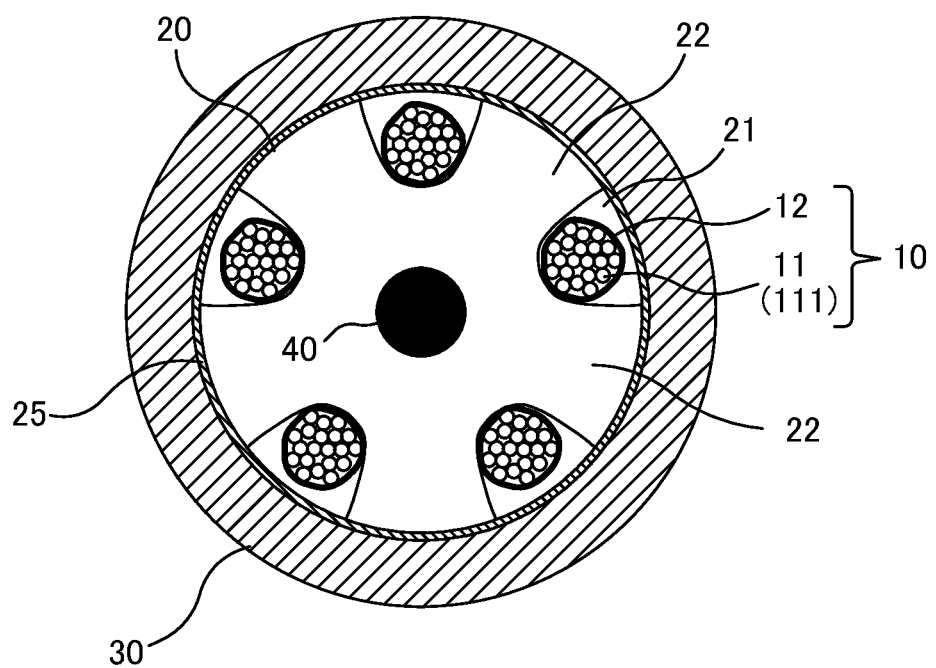
FIG. 7 is a cross-sectional view illustrating an optical fiber cable 1 in a modification of a first embodiment.

FIG. 7 is a cross-sectional view illustrating an optical fiber cable 1 in a modification of a first embodiment. The modification of the optical fiber cable is a so-called slot-type optical fiber cable. The slot-type optical fiber cable means an optical fiber cable having a structure including slots, which are groove portions each housing a single optical fiber or an optical fiber ribbon.

The optical fiber cable 1 of the modification includes the optical fiber units 10, a slot core 20, the sheath 30, and the tension member 40. The functions of such members excluding the slot core 20 are similar to those described in FIG. 1.

The slot core 20 is a member corresponding to the base of the optical fiber cable 1 of the modification, and a plurality of slots 21 are provided to the outer periphery thereof at predetermined intervals. In the optical fiber cable 1 illustrated in FIG. 7, five slots 21 are provided, at regular intervals, to the outer periphery of the slot core 20. The slots 21 are groove portions that are opened toward the outside (outer periphery side) in the radial direction of the slot core 20, and ribs 22 are formed on both sides of each slot 21. The optical fiber units 10 each tied in a bundle are housed in the slots 21, respectively. In FIG. 7, the slots 21 are of a substantially U-shape, and of such a shape that the optical fiber units 10 each tied in a bundle are easily housed therein, respectively. It should be noted that the number and the shape of the slots 21 provided to the slot core 20 are varied appropriately with the size of the optical fiber cable 1, the number of the optical fibers 111 which are to be housed therein, and/or the like.

In the modification, the slots 21 are provided so as to draw a spiral in one direction with respect to the axial direction of the slot core 20 (longitudinal direction of the optical fiber cable 1). Further, the slots 21 may be provided so as to repeatedly run in an S-wound shape and a Z-wound shape alternatively, that is, so as to draw a spiral shape of a so-called SZ-type. In this case, such an optical fiber cable 1 is also called as an SZ-slot type optical fiber cable.

Press-wrapping 25 for slots is provided between the slot core 20 and the sheath 30. The press-wrapping 25 for slots is a sheet-like member that covers so as to wrap the outer periphery of the slot core 20. With the provision of such press-wrapping 25 for slots, the sheath 30 can be restrained from sinking, from the outside, into the opening portions of the slots 21.

The optical fiber cable 1 having such a structure can also obtain preferable water resistance, with the bundling member 12, which has a surface attached with the water-absorbent substance 125, being wound around the optical fiber units 10 housed therein, similarly to a first embodiment.

Other Embodiment

The above embodiments are intended to facilitate the understanding of the present disclosure but not to limit the disclosure. And it is needless to say that modifications and improvements of the present disclosure can be made without departing from the scope of the disclosure and equivalents thereof are also encompassed by the disclosure.

<Intermittently Fixed Ribbon>

In an embodiment described above, such an example that four optical fibers 111 are coupled is described as the intermittently fixed ribbon 11. However, the number of optical fibers configuring the intermittently fixed ribbon 11 is not limited thereto, but the number of fibers may be increased or decreased. Further, the connecting locations and the number of the connecting portions 115 each connecting every two of the optical fibers 111 immediately adjacent to each other can be varied with uses of the intermittently fixed ribbon 11.

<The Number of Bundling Members>

In an embodiment described above, such an example is described that the number of bundling members that are wound around a bundle of optical fibers is two. However, the number of bundling members provided to each optical fiber unit is not limited thereto. For example, the number of bundling members wound around a bundle of optical fibers may be three or more. As described above, considering the amount of water-absorbent substance supplied by the bundling member and workability in the intermediate branching operation of optical fiber cables, it is preferable that a plurality of bundling members are provided with respect to each optical fiber unit such that each of the bundling members can easily be detached.

REFERENCE SIGNS LIST

1 optical fiber cable,
10 optical fiber unit, 10A, 10B, 10C optical fiber unit,
11 intermittently fixed ribbon, 111 optical fiber,
115 connecting portion,
12 bundling member, 12A bundling member, 12B bundling member,
121 core portion, 122 cladding portion,
125 water-absorbent substance,
15 press-wrapping,
20 slot core,
21 slot, 22 rib, 25 press-wrapping for slots,
30 sheath,
40 tension member

The invention claimed is:

1. An optical fiber cable comprising:
a plurality of optical fiber units each including
a plurality of optical fibers and
a bundling member wound around an outer periphery of a bundle of the plurality of optical fibers,
wherein the bundling member having a surface on a side not contacting the outer periphery of the bundle of the optical fibers and on another side contacting the outer periphery of the bundle of the optical fibers, the surface on both the side and the another side is detachably attached with a water-absorbent granular substance, and
wherein the bundling member including a core portion and a cladding portion provided to coat the core portion, the cladding portion being configured with a member having a melting point lower than a melting point of the core portion.

2. An optical fiber cable according to claim 1, wherein at least one of the optical fiber units includes an optical fiber ribbon, the optical fiber ribbon being configured with optical fibers arranged in a parallel manner, the optical fibers included in the plurality of optical fibers, the optical fiber ribbon having connecting portions intermittently arranged in a longitudinal direction and a width direction in the optical fiber ribbon, the connecting portions connecting each two optical fibers immediately adjacent to each other in the optical fibers.

3. An optical fiber cable according to claim 1, wherein a plurality of bundling members is wound around the outer periphery of the bundle of the optical fibers, the bundling member including the plurality of bundling members.

4. An optical fiber cable according to claim 1, wherein at least one of the optical fiber units includes at least 500 of the optical fibers.

5. An optical fiber cable according to claim 1, wherein a rate of a volume of the bundling member after absorbing moisture to a volume of the bundling member before absorbing moisture is equal to or more than 3.

6. An optical fiber cable comprising:
a plurality of optical fiber units each including
  a plurality of optical fibers, and
  at least one of a plurality of bundling members wound around an outer periphery of a bundle of the plurality of optical fibers, wherein the at least one of the bundling members having a surface detachably attached with a water-absorbent granular substance, wherein the plurality of optical fiber units including two or more optical fiber units adjacent to each other that are disposed to contact each other with the at least one of the bundling members therebetween, wherein the at least one of the bundling members including a core portion and a cladding portion provided to coat the core portion, the cladding portion being configured with a member having a melting point lower than a melting point of the core portion, the cladding portion having a surface attached with the water-absorbent granular substance, the plurality of the bundling members being would around the outer periphery of the bundle of optical fibers, the bundling members including two bundling members being joined to each other by heat-sealing.

* * * * *